United States Patent [19]
Vercasson

[11] 3,784,443
[45] Jan. 8, 1974

[54] DEVICE FOR THE LEAK-TIGHT ASSEMBLY OF HEAT EXCHANGERS IN NUCLEAR REACTORS

[75] Inventor: Michel Vercasson, La Celle-Saint Cloud, France

[73] Assignee: Commissariat a l'Energie Atomique, Paris, France

[22] Filed: Aug. 4, 1971

[21] Appl. No.: 168,924

[30] Foreign Application Priority Data
Aug. 7, 1970 France .............................. 70.29197

[52] U.S. Cl. .................. 176/63, 176/40, 176/62, 176/64, 165/74
[51] Int. Cl. ..... G21c 13/02, G21c 13/06, F28d 1/06
[58] Field of Search .................. 176/65, 62, 40, 63; 165/159, 74

[56] References Cited
UNITED STATES PATENTS

| | | |
|---|---|---|
| 3,498,880 | 3/1970 | Gollion ............................ 176/65 X |
| 3,656,543 | 4/1972 | Wolowdiak ......................... 176/65 |
| 3,580,807 | 5/1971 | Kumpf ................................. 176/65 |
| 3,624,759 | 11/1971 | Carlson ............................... 176/62 |
| 3,507,747 | 4/1970 | Strohmeyer ...................... 176/65 X |
| 3,255,089 | 6/1966 | Deighton .......................... 176/65 X |
| 3,161,570 | 12/1964 | Hammond et al. ............... 176/65 X |
| 3,150,051 | 9/1964 | Ammon ............................. 176/65 X |
| 3,187,807 | 6/1965 | Ammon ............................... 165/74 |
| 3,511,310 | 5/1970 | Van Loo ........................... 165/74 X |

Primary Examiner—Carl D. Quarforth
Assistant Examiner—Roger S. Gaither
Attorney—Craig, Antonelli & Hill

[57] ABSTRACT

A leak-tight passage is provided for a heat-exchanger shell within an opening formed in the primary vessel wall of a fast reactor. The opening comprises a vertical cylindrical collar surmounted by an annular bell which is rigidly fixed to the heat-exchanger shell and shaped so as to constitute in conjunction with the collar an annular space between the cylindrical collar an annular bell which is maintained unprimed by injecting a gas under pressure into this space.

6 Claims, 2 Drawing Figures

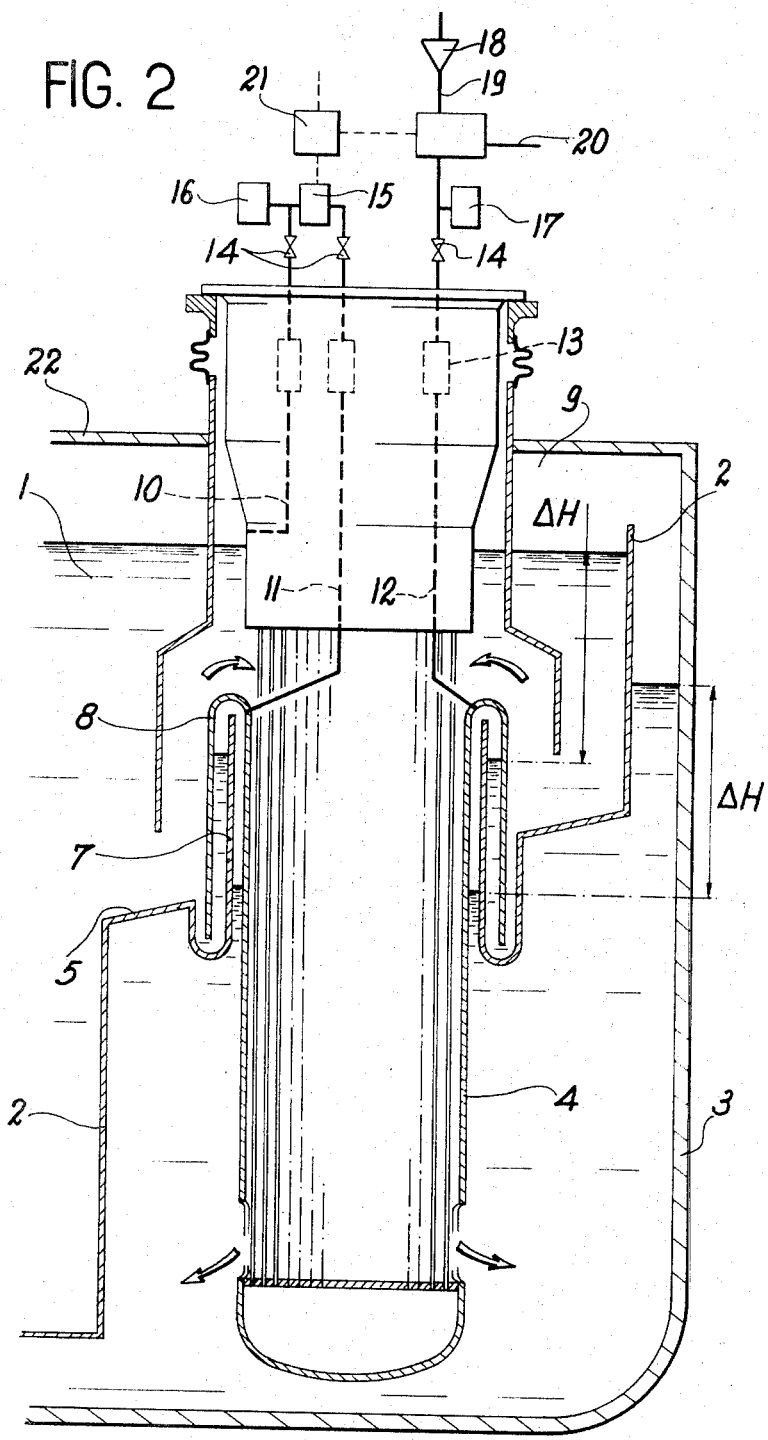

DEVICE FOR THE LEAK-TIGHT ASSEMBLY OF HEAT EXCHANGERS IN NUCLEAR REACTORS

In fast reactors, the coolant is often liquid sodium by reason of its high heat-transfer coefficients, the low pressure of coolant circuits and the high reliability of cooling in all states of reactors.

This fluid circulates in a closed circuit from a primary vessel containing the reactor core at the bottom central portion to a main outer vessel from which the fluid is returned by pumping to the reactor core and to the primary vessel. The equipment units which are necessary for cooling and especially the pumps and intermediate heat exchangers which operate in parallel are immersed in the liquid sodium around the reactor core. The shells of the active portion of each heat exchanger extend vertically within the two vessels and the wall penetrations of the primary vessel are intended to be leak-tight.

This invention relates to a simple arrangement for the leak-tight assembly of each heat exchanger; this arrangement results in total leak-tightness while allowing freedom for the radial and axial displacements of the heat exchanger which arise especially from temperature or pressure variations and permits assembly or disassembly of the heat exchanger without any need for working within the interior of the reactor.

The invention is concerned with a device for the leak-tight assembly of a heat-exchanger shell through an opening of the primary vessel wall of a nuclear reactor, characterized in that the opening comprises a vertical cylindrical collar surmounted by an annular bell which is rigidly fixed to the heat-exchanger shell, said bell being shaped so as to constitute in conjunction with the collar an annular spore between the collar and bell which is maintained unprimed by injection of a gas at the top portion.

The gas will preferably be the same as the so-called blanket or cover gas which is present above the liquid sodium beneath the shield roof of the reactor. This gas is usually argon.

Further characteristic features of the invention will become apparent from the description which is given hereinafter, reference being made to the accompanying drawings which illustrate one non-limitative example of construction of the device contemplated in the foregoing, and in which:

FIG. 2 is a detailed but diagrammatic view of the right-hand portion of FIG. 1 and showing the leak-tight assembly of a heat exchanger with the ducts and elements which serve to ensure good operation of the device.

Figure 1:
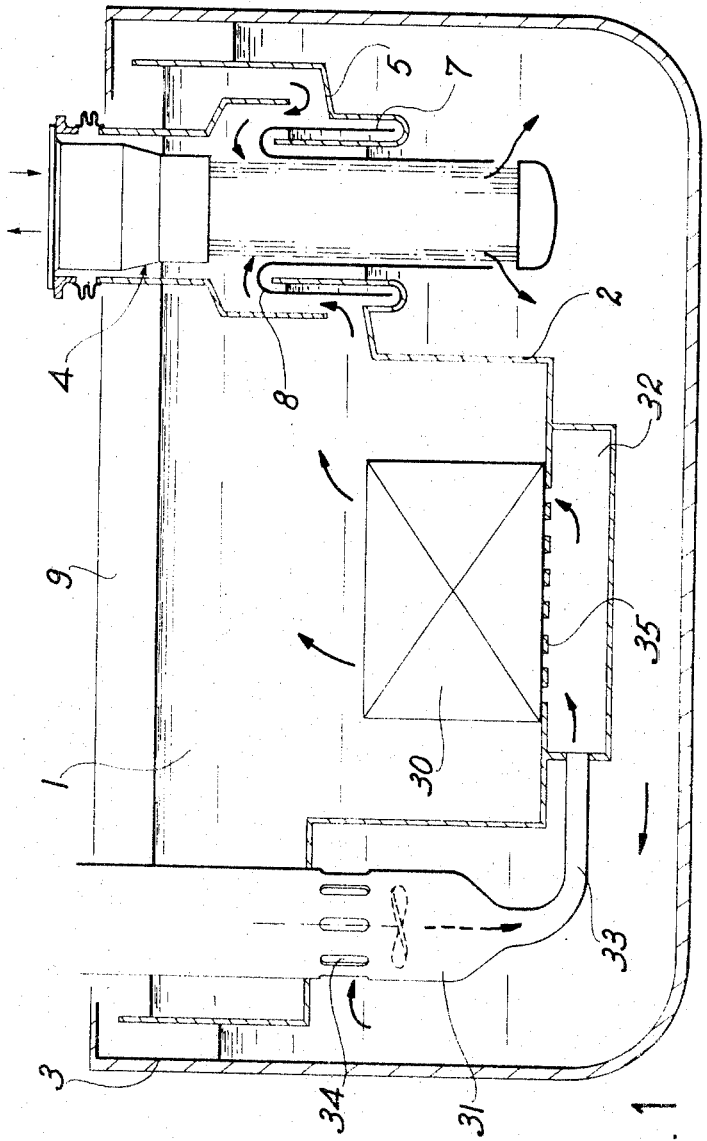
FIG. 1 is a diagrammatic view in transverse sectional elevation showing a reactor equipped with the device according to the invention.

As shown in FIG. 1, the primary vessel 2 of the nuclear reactor and the main vessel 3 are both filled with liquid sodium 1. The vertical centrifugal pumps such as the pump 31 suck the liquid sodium from the main vessel 3 through the windows 34 and inject the sodium through a duct 33 into the collector 32; from this collector, the liquid sodium passes upwards through the diagrid 35 into the reactor core 30 and is distributed within the primary vessel 2, then flows into the intermediate heat exchangers 4 so as to return into the main vessel and repeat the same cycle. The argon blanket is located at 9 above the liquid sodium.

As shown on the right-hand side of FIG. 1, the shell of the active portion of each heat exchanger 4 extends through the wall which forms a separation between the primary vessel 2 and the main vessel 3 within the upward conical portion of said wall or skew section 5. The device according to the invention for providing a leak-tight heat-exchanger penetration is shown in general outline and will now be described in detail together with its ancillary elements, reference being made solely to FIG. 2.

The opening for the penetration of the heat exchanger 4 through the skew section 5 is delimited by a vertical cylindrical collar 7; an annular bell 8 having a height which is substantially equal to that of the collar has been added to the heat-exchanger shell. The respective transverse dimensions of the collar and of the bell are such that, at the time of assembly, the bell is fitted over the collar in the position shown in the drawings. An annular space (7, 8) is thus formed around the entire heat exchanger. In order to ensure leak-tightness, said space must necessarily be continuously unprimed and this result is obtained by injecting argon under sufficient pressure into the top portion of the space. Under these conditions, the levels of the sodium within the inner and outer branch of the annular space reproduce respectively the levels of the liquid sodium within the main vessel and within the primary vessel with a relative displacement Δ H in height.

If Δ P is the pressure difference between the argon contained in the space (7, 8) and the argon blanket 9, we have in accordance with the basic theorem of hydrostatics:

$$\Delta H = \Delta P / \rho g$$ wherein $\rho$ is the mass per unit volume of the sodium, $g$ is the acceleration of gravity.

It is possible to maintain the levels within the bell at acceptable values in all cases of operation of the reactor, namely during normal operation or during fault conditions, and in particular to prevent any priming of the space which would divert a part of the flow away from the normal path which passes through the heat exchangers.

By reason of the fact that the levels within the space cannot be measured directly, said levels can be deduced from the levels within the reactor by means of the measurement of ΔP. The quantity last mentioned will therefore be employed for the operation of any level-controlling and regulating system.

In order to permit an operational control of this type under the influence of ΔP, the following equipment is accordingly employed:

The value of ΔP is measured by means of a differential pressure transducer 15 which is connected respectively to the pressure taps 11 on the siphon and 10 on the argon blanket 9 beneath the shield roof 22 of the reactor; the reference numeral 12 designates the pipe for the supply and discharge of argon contained in the space between the bell and collar respectively through the electrovalves 19 and 20.

The supply of argon to the space between the bell and collar or discharge of argon from this latter is accordingly controlled by a device 21 which is actuated by the differential pressure transducer 15 and causes either opening or closure of one of the electrovalves 19 and 20 in accordance with requirements.

The reference numeral 13 designates sodium vapor traps and the numeral 14 designates isolating valves;

the cover-gas pressure gauge has the reference 16 and the bell has the reference 17.

It is worthy of note that, under conditions which will be explained below, the discharge valve 20 can be dispensed with and replaced by a check valve 18 upstream of the valve 19 in the pipe 12.

Control and regulation of the levels within the bell or the annular space between the cylindrical collar and annular bell can be carried out by means of the equipment which has just been described in accordance with three different methods:

a. Method of the isolated bell

Assuming by way of example that the reactor is shut down under conditions of handling of elements, the bell is filled with argon until $\Delta P$ is given a reference value $\Delta P_0$; the bell is then isolated by closing the valve 14 of the pipe 12 in order to retain a constant quantity of argon. It is possible to choose $\Delta P_0$ in such a manner as to ensure that the progressive variation of temperatures, of pressures and of levels within the reactor during operation of this latter does not result either in priming of the siphon or in leakage of argon at the base of the bell. Progressive variation of levels within the bell is followed continuously by virtue of the measurement of $\Delta P$ and of levels within the reactor.

As a result of a suitable arrangement of the ducts, a single equipment unit for measuring and supply (pressure transducers and valves) can be employed for all heat exchangers (usually six).

b. Method involving maintenance of $\Delta P$ between two reference values

The value of $\Delta P$ is maintained between two reference values $\Delta P_1$ and $\Delta P_2$ and overstepping of these threshold values automatically results in either admission or discharge of argon into or from the bell through the valves 19 or 20. A single equipment unit can also be contemplated.

c. Method involving maintenance of $\Delta P$ above a minimum threshold value

This method is adopted when it is desirable to have a circulation of argon in one direction within the external pipes in order to reduce dangers of clogging and the problems set by the activity of the argon.

The supply of the bell is carried out through the check valve 18.

In order to prevent any priming of the space between the annular bell and cylindrical collar, the value of $\Delta P$ is not permitted to fall below the minimum threshold $\Delta P_1$ which is imposed by the previous method. On the other hand, removal of excess argon is permitted to take place in the form of bubbles at the bottom portion of the bell during temperature rises.

The disadvantage of the method last mentioned lies in the fact that it entails the need for an equipment unit which is adapted to each heat exchanger.

The device according to the invention thus achieves the desired standard of leak-tightness by pneumatic means. This solution has many advantages over any mechanical systems which could be devised, viz:

elimination of forged and machined parts of bellows-type compensators, elimination of contacts, thereby removing the danger of wear and seizure, elimination of displacement stresses, reduction of thicknesses and therefore of thermal stresses, insensitivity to small deformations, complete removal of leakages of cooling fluid.

What we claim is:

1. In a nuclear reactor with rapid neutrons cooled by circulation of a liquid metal, comprising a principal tank with a vertical axis, and a primary tank being coaxial with respect to the principal tank and containing the core of the reactor, said tanks being filled with the liquid metal topped by a cover of a neutral gas, the primary tank comprising a transverse notch equipped with openings for communication between the two tanks, receiving bodies of heat exchangers having a vertical axis, being distributed around the core and dipping into the liquid metal, each exchanger comprising at the upper part thereof contained in the primary tank above the transverse notch inlet orifices for the liquid metal, and at the lower part thereof in the principal tank below the transverse notch, outlet orifices for said metal, and pumps for circulating the liquid metal discharging from each exchanger and feeding it back into a collector disposed under the core, a regulable sealing device mounted between the primary tank and the principal tank in each of the openings of the transverse notch, said device comprising a cylindrical annular collar surrounding the body of the exchanger traversing each opening, being integral with the notch and open at the upper part thereof in the primary tank, an annular bell having a height substantially equal to that of the collar and being integral with the body of the exchanger, being open at the lower end thereof and outwardly capping and covering said collar and forming an annular space around the entire heat exchanger, and a system for injecting a neutral gas under pressure into said annular space comprised between the bell and the collar for preventing the direct passage of the liquid metal from the primary tank into the principal tank through said annular space.

2. A leak-tight assembly device in accordance with claim 1, wherein the gas is the same as the cover gas which is located above a free level of liquid metal.

3. A device according to claim 2, wherein the cover gas is argon.

4. A device in accordance with claim 1, wherein said device comprises an equipment unit for controlling and regulating the levels of liquid metal within the annular space around the entire heat exchanger formed by the annular bell and cylindrical collar and said unit comprises a transducer for measuring the pressure difference, $\Delta P$, between the gas in the annular space and the cover gas, said transducer being capable of selectively initiating according to the values of $\Delta P$, the operation of a valve for regulating the pressure of the gas confined within the annular space defined by the collar and bell.

5. A device in accordance with claim 4, wherein the atmosphere of the annular space is isolated by means of a valve after filling with gas at a pressure corresponding to a reference value $\Delta P_0$ which is chosen so as to ensure leak-tight operation of the annular space with a constant quantity of gas within the annular space.

6. A device in accordance with claim 4, wherein the operation of the device involves regulation between a minimum threshold value $\Delta P_1$ and a maximum threshold value $\Delta P_2$ and overstepping of said values causes the transducer to initiate either admission or discharge of gas into or from the annular space.

* * * * *